Patented Aug. 10, 1937

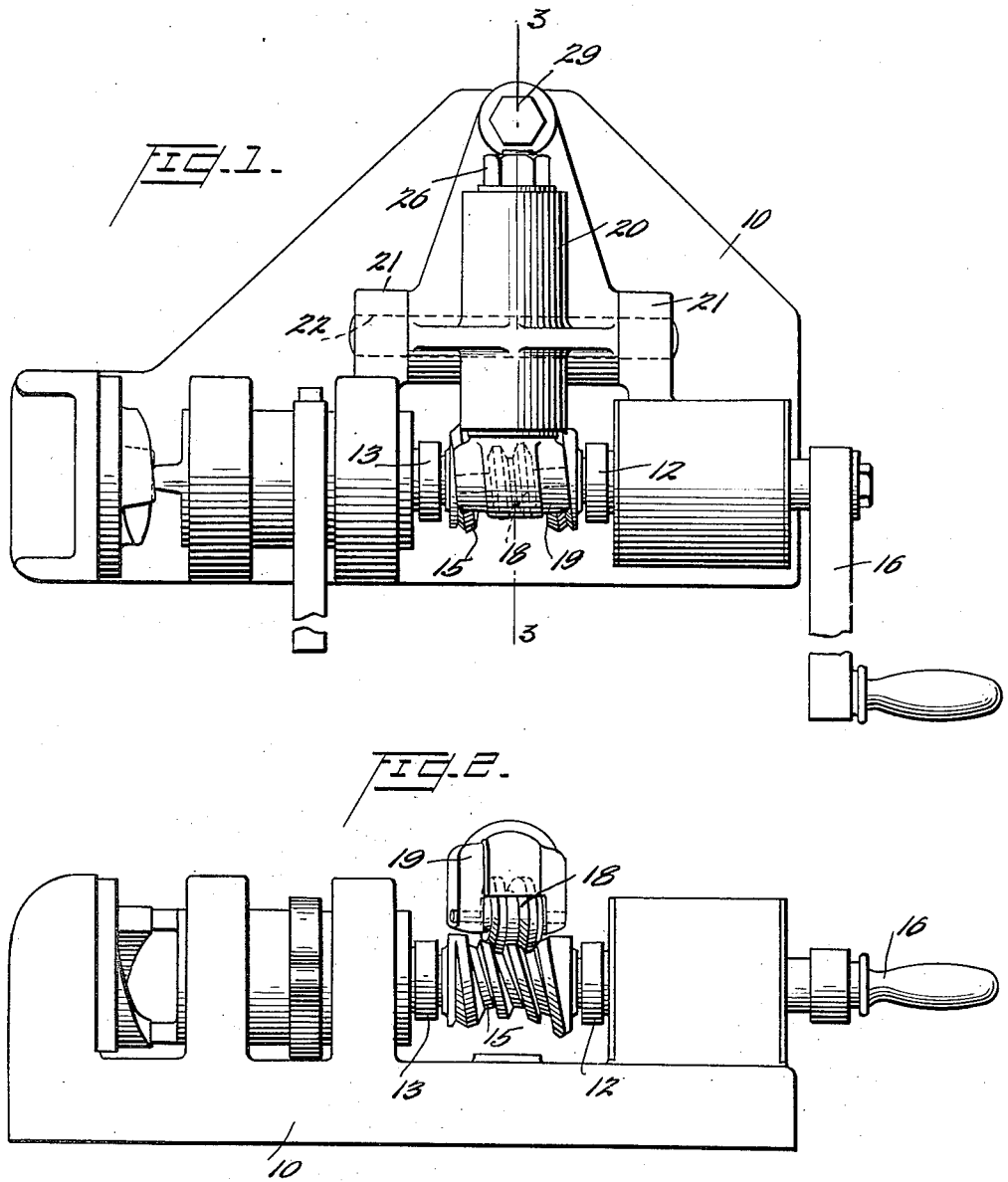

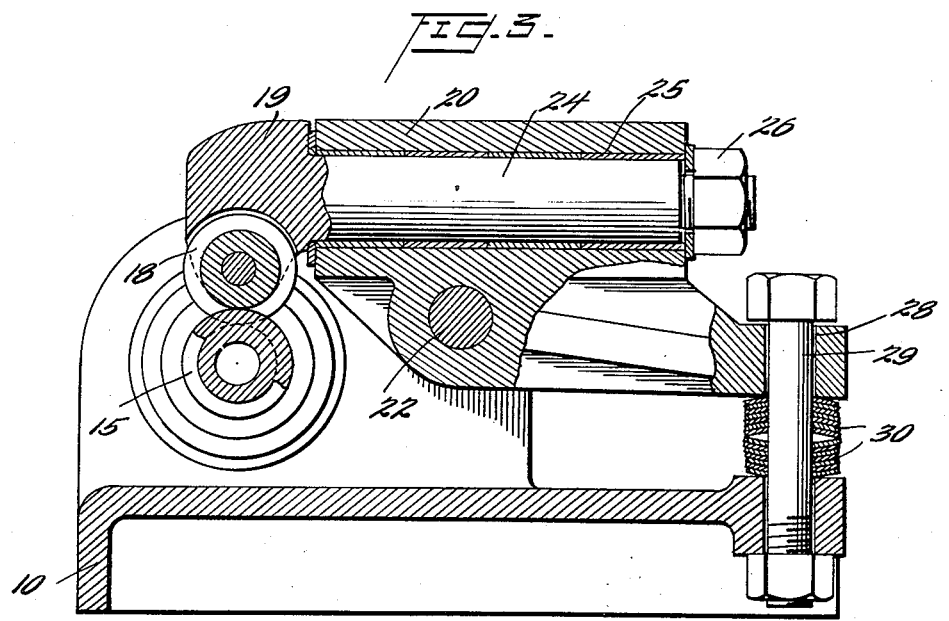
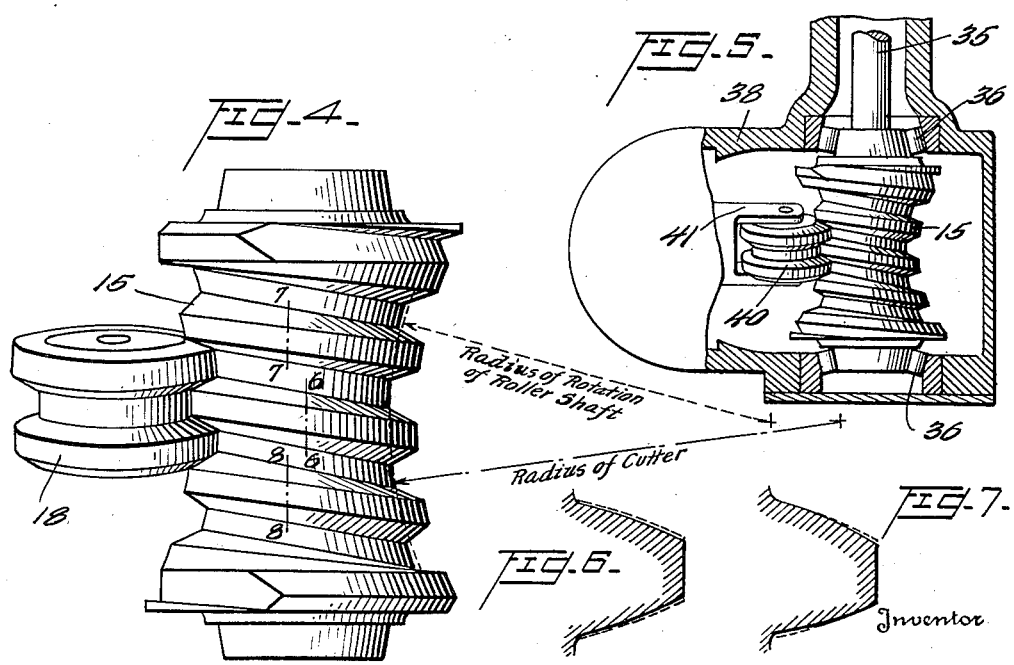

2,089,732

UNITED STATES PATENT OFFICE 2,089,732

WORM GEAR BURNISHING MACHINE AND METHOD

John M. Christman, Detroit, Mich., assignor to Packard Motor Car Company, Detroit, Mich., a corporation of Michigan Application March 2, 1935, Serial No. 9,093

16 Claims. (Cl. 29—90)

This invention relates to a method of and apparatus for forming and finishing worms, for instance worms such as are commonly employed in the steering gear of motor vehicles. In its preferred form the invention is applicable to the hour glass type of worm and is more particularly intended for the burnishing of hour glass worms which are designed for use with worm followers of the circumferentially ribbed roller type, this type of follower being frequently employed in lieu of the more conventional toothed worm gear or sector for the purpose of reducing friction in the steering gear.

It is of course essential that proper meshing of the roller with the worm be ensured, and it is desirable for this purpose that the engaging surfaces of the worm and roller be of reasonably large area, and accurate and smooth finishing of both roller and worm is of the greatest importance. By practicing the present invention it is possible to produce reasonably true and sufficiently smooth working surfaces on the worm and at the same time to harden and toughen these surfaces, the result of the burnishing operation being much more satisfactory in these respects than if grinding of the worm were resorted to. The invention contemplates the employment of one or more worm followers, preferably in the form of master rollers, each provided with one or more suitably hardened ribs adapted to mesh with the worm to be burnished, the worm and roller executing during the burnishing operation movements corresponding generally to those executed in actual use, pressure being simultaneously applied between the contacting surfaces.

In the formation of worms of the hour glass type a cutter is commonly employed, this cutter being rotated about an axis transverse to the axis of the worm, rotation being simultaneously imparted to the worm on its own axis. This is a conventional method of generating a worm of the hour glass type; whether this method is employed or not, a worm generated by any of the more conventional methods is characterized by a thread of varying helix angle. Thus adjacent the central portions of the worm where the diameter is least, the helix angle of the thread will be greatest, whereas towards either end of the worm, as measured axially, the helix angle will be less. Obviously this varying helix angle offers certain difficulties when an effort is made to mesh with the worm a follower which is so constructed as to conform to any given helix angle, in other words, a follower which at the point of contact with the worm thread extends generally in the direction of the thread and which is not so supported as to be capable of accommodating itself to some other thread direction.

Such is the case with a follower of the roller type and if it is preferred, as is customarily the case, that accurate meshing of the roller shall be effected adjacent the central portion of the worm, the roller will not properly mesh at the end portions of the worm owing to the lesser helix angle of the worm thread.

In accordance with the present invention it is proposed to support the worm follower for rotation on an axis which is spaced to a less extent from the worm axis than is the axis of the cutting tool which generates the thread. It is also proposed to deform the thread, particularly adjacent either end of the worm, to enable it to more readily cooperate with a follower designed more particularly to mesh properly with the thread at the central portion of the worm.

More specifically it is the purpose of the present invention to burnish a worm of the character described by means of a hardened roller which is supported for traversing movement across the worm and in engagement with the worm thread about an axis which corresponds generally with the axis of the follower in the finished and assembled article and which describes an arc of less radius than that which is described by the generating tool. It is found that by this burnishing operation certain of the side faces of the thread will be altered in shape and in general those portions of the side faces of the thread on either side of the central portion of the worm which cooperate with the roller in the assembled gearing will be deformed and flattened so as to provide a broader area of contact between the roller and worm adjacent the ends of the latter.

If, for instance, a burnishing roller having one or more circumferential ribs is supported for rotation about an axis transverse to the worm axis and disposed on a line substantially perpendicular to the worm axis adjacent the central portion of the worm, but closer to the worm than the generating axis thereof, the central portion of the worm thread will be burnished without effecting substantial change in the contour thereof. Those portions of the thread toward the end of the worm, however, will be altered in contour; in general the width of the groove between adjacent threads will be wider, and the worm will mesh more properly and over a greater contact area with a follower of the type which is particularly designed to accommodate that portion of the worm thread adjacent the center of the worm.

Further objects and features of the invention will be apparent from the following description taken in connection with the accompanying drawings, in which Figure 1 is a plan view of apparatus for carrying out the method of forming worm gears described in this application;

Figure 2 is an end elevation of the arrangement shown in Figure 1;

Figure 3 is a sectional view taken substantially on the line 3—3 of Figure 1;

Figure 4 is an illustration of a worm and follower in meshing engagement;

Figure 5 is a sectional view through a steering gear housing illustrating the worm and follower in the finished and assembled condition; and Figures 6, 7, and 8 are fragmentary sectional views taken respectively on the lines 6—6, 7—7, and 8—8 of Figure 4 and illustrating the thread contour.

For convenience in describing the invention reference is made to the preferred embodiment thereof and specific language is employed. It will nevertheless be understood that no limitation of the scope of the invention is thereby intended but that various changes are contemplated such as fall within the spirit and scope of the appended claims.

Referring now to Figures 1 to 3 inclusive which illustrate one form of apparatus for carrying out the method described herein, it will be observed that a base 10 is provided, this base affording a support for a conventional head stock 12 and tail stock 13 in which a worm 15 is mounted for rotation on its own axis in the usual manner. As hereinbefore explained, this worm is of the type so generated, preferably by a single cutting operation only, that the helix angle of the thread is greatest at the central portion of the worm and decreases toward either end of the worm. Means may be provided for rotating the worm on its axis, a handle 16 associated with the head stock 12 being illustrated for that purpose.

Immediately above the worm and in engagement with the threads thereof is supported a follower 18 which in the preferred embodiment of the invention assumes the form of a circumferentially ribbed roller. While it is preferred to employ a roller having two circumferential ribs, either a less or greater number of ribs may be provided. The roller 18 is supported for rotation on its own axis in the head portion 19 of a carrier, the latter having a generally cylindrical shaft portion 24 which is supported for pivotal movement about an axis transverse to the worm axis. The worm axis and carrier axis are related as in the finished and assembled gearing, the carrier axis being located generally on a perpendicular erected on the worm axis adjacent the central portion of the worm and being spaced to a less extent from the worm axis than the original axis of generation of the worm.

Referring more particularly to Figure 3, it will be observed that the shaft portion 24 of the carrier is journalled in a mounting member 20 by means of one or more bushings 25, being retained in position by a nut 26 threaded on the remote end of the shaft portion 24 of the carrier. The mounting member 20 is in turn supported on the base 10 for rotation about an axis generally parallel with the worm axis by means of a pin 22 carried in ears 21 which are preferably formed integrally with and are directed upwardly from the base. The mounting member 20 is urged to rotate in a counterclockwise direction about the pin 22, for instance by the provision of a plurality of resilient washers 30 which are threaded on a bolt 29 carried by the base 10 and extending through an aperture 28 in the mounting member 20, these washers being suitably compressed between the mounting member and the base.

It will be understood that during the operation of deforming or burnishing the worm, the latter is in the relatively soft or unhardened condition, whereas the roller 18 has been hardened by any suitable treatment. Thus if the handle 16 be rotated, the follower 18 will traverse the worm from one end to the other and will readily burnish and flatten such portions as are directly engaged thereby, the necessary pressure being provided by the action of the spring washers 30. It is an important feature of the invention, as hereinbefore explained, that the roller 18, while permitted rotation on its own axis, is so mounted in the carrier 19 as to be incapable of rotation therein about any other axis, for instance about an axis intersecting the worm axis and the roller axis. In other words, the roller 18 as shown more particularly in Figure 4 is supported on an axis which is inclined with respect to any plane containing the worm axis, the ribs of the roller extending generally in the direction of the worm thread adjacent the central portion of the worm.

It will be appreciated that this is important in order that very accurate meshing of the worm and roller adjacent the central portion of the worm be ensured. It is this portion of the worm which is most used in the steering of a vehicle, the roller travelling toward the ends of the worm only when the vehicle is steered around a curve. However, as the roller passes toward either end of the worm in traversing the latter, the angular disposition of the circumferential ribs of the roller no longer conforms to the helix angle of the thread and it is necessary to provide greater clearance between the roller and the thread to prevent binding. It is furthermore desirable to provide this clearance toward either end of the worm so that when adjustments are effected to compensate for wear of the central portion of the worm, which is subjected to the most use, there will be no binding of the roller with the worm near the ends of the latter, at which point less wear occurs. As hereinbefore suggested, this clearance is secured by the employment of a radius of swinging movement for the follower which is less than the radius of generation of the worm employed during the initial cutting operation, the relationship between these radii being indicated generally in Figure 4 of the drawings.

The provision of this clearance is not, however, sufficient to ensure proper meshing since it is found that toward the ends of the worm the roller and the worm threads tend to establish a point or line contact and not a surface contact. Under these circumstances both the end threads of the worm and the contacting portions of the roller tend to wear rapidly during use with the result that the roller soon ceases to mesh accurately with that portion of the worm thread which is adjacent the center of the worm, at which point accurate meshing is most necessary.

However, when the hardened roller is supported as indicated in the accompanying drawings and is traversed across the relatively soft worm, pressure being applied to maintain the contacting surfaces in intimate engagement, it is found that flattening of certain portions of the side walls of the worm thread follows, and this flattening of the thread walls is sufficient to ensure in the finished article a contact over a considerable area between the roller and the thread walls over substantially the entire length of the thread with consequent avoidance of rapid wear.

It will of course be appreciated that the nature and extent of contact between the worm and the roller in the finished gearing can be controlled by varying the pressure between the burnishing roller and the worm. Such pressure may be conveniently regulated by varying the number or character of the washers 30. Positive means may be substituted for resilient means to produce the necessary pressure between the burnishing roller and the worm if desired.

The manner in which the contour of the worm thread is altered may be understood from an inspection of Figures 6 to 8 inclusive of the drawings. It will be observed from Figure 6 that the portion of the worm thread adjacent the center of the worm, as measured axially, is burnished in such a way as to leave substantially unchanged the shape of the worm thread as viewed in section. Figures 7 and 8, on the contrary, indicate clearly that that face of the worm thread remote from the center is burnished to a greater extent adjacent the tip of the thread whereas that face of the worm thread directed toward the central portion of the worm is burnished to the greatest extent adjacent the base. In effect the width of the groove in the worm is increased so that the follower may be more readily accommodated to the worm and binding action between the follower and worm as the result of variation of the helix angle of the thread of the latter will be avoided. At the same time the area of contact between the cooperating surfaces of the roller and worm is materially increased with consequent reduction in wear of the finished and assembled gearing.

Figure 5 illustrates one mode of assembling the finished gearing. The worm 15 which has been formed, burnished, and hardened is keyed or otherwise secured to the lower end of the steering column 35 and is supported by means of bearings 36 in the conventional steering housing 38. A follower 40 in the form of a roller which is preferably similar to that used during the burnishing operation is supported in a carrier 41 in meshing relation with the worm 15, the carrier 41 being in turn supported for rotation on an axis transverse to the worm axis and spaced to a less extent from the worm axis than the original generating axis of the worm. The manner in which the carrier 41 is connected with the vehicle road wheels for steering purposes is of course conventional and forms no part of the present invention.

In the form of the invention shown in the drawings the worm thread is provided with a slightly crowned face, as indicated more particularly in Figures 6 to 8, while the burnishing roller and the roller in the assembled gearing are provided with substantially flat side faces. It will nevertheless be understood that the shape as viewed in section of the worm thread and the ribs on the roller may differ from that illustrated.

It has been found that practice of the present invention results not only in smoother operation of the gearing and in much less wear over an extended period of use, but actually simplifies to a considerable extent the forming and finishing of the worm and materially reduces the expense of production. Thus it is found that only one rough cut need be taken in generating the worm, the burnishing operation affording the smoothed polished surface which is desirable in gearing of this character while deforming the worm thread to improve the shape. Frequently only one traversing movement of the burnishing roller across the worm is required in order to attain the desired result.

While I have shown and described my invention as practiced with a master burnishing roller, it will be appreciated that the invention is in some aspects broader and may be carried out by the use of followers of other type or by the employment of any means which will effect the deformation of the worm thread in the manner herein described.

In the appended claims, the expression "generating axis of the worm" is intended to indicate the position in space which would be occupied by the pivotal axis of a swinging cutter arranged to generate the worm in question.

Having thus described the invention, what is claimed as new and desired to be secured by Letters Patent is:

1. A method of making a worm of the hour glass type which comprises generating on a blank a thread having a helix angle varying axially of the worm, and thereafter deforming the thread on either side of the central portion of the worm as measured axially by rotating said worm in contact with a burnishing member swingable about an axis differing from the generating axis of said worm but disposed closer to the worm, to provide increased surface contact of the thread with a follower adapted for meshing with a thread of constant helix angle.

2. A method of making a worm of the hour glass type which comprises generating on a blank a thread having a helix angle varying axially of the worm, meshing a circumferentially ribbed roller with the worm and displacing the roller about an axis transverse to the worm axis and lying in a line substantially perpendicular to the worm axis at the center of the worm to burnish the worm, and maintaining during the burnishing operation the initial inclination of the rib of the roller with respect to a plane containing the worm axis and intersecting the roller.

3. A method of burnishing an hour glass worm generated by a cutting tool moved in an arc about a predetermined center, which comprises meshing said worm with a circumferentially ribbed burnishing roller, and moving said roller about an axis lying on a line substantially perpendicular to the worm axis at the center of the worm to cause the roller to traverse the worm, and maintaining substantially an inclination of the rib of the roller corresponding to the helix angle of the worm thread adjacent the central portion thereof throughout the entire traversing movement of the roller.

4. A method of burnishing an hour glass worm generated by a cutting tool moved in an arc about a predetermined center, which comprises meshing said worm with a circumferentially ribbed burnishing roller, and moving said roller about an axis lying on a line substantially perpendicular to the worm axis at the center of the worm and at a less distance from the worm axis than the center of movement of the cutting tool to cause the roller to traverse the worm, and maintaining substantially an inclination of the rib of the roller corresponding to the helix angle of the worm thread adjacent the central portion thereof throughout the entire traversing movement of the roller.

5. The method of increasing the area of contact between an hour glass worm and a follower which comprises supporting a hardened follower in meshing engagement with the unhardened worm for rotation about substantially the center of rotation of the follower in the finished assembled gearing, maintaining a fixed relationship between the follower and the worm consistent with the helix angle of the worm at the central portion of the latter, and rotating the worm to cause the follower to traverse the worm thread.

6. The method of making worms of the hour glass type which comprises generating a worm thread on a blank corresponding to that which would be formed by rotating a worm and cutter at constant velocity about spaced, transversely disposed axes, the helix angle of said thread being less at points on either side of the central portion of the worm, meshing with the thread thus generated a follower having a portion for engagement with the thread fashioned and maintained in substantial conformity with the helix angle of the worm at the central portion of the latter, and traversing said follower across the worm.

7. The method of making worms of the hour glass type which comprises generating a worm thread on a blank corresponding to that which would be formed by rotating a worm and cutter at constant velocity about spaced, transversely disposed axes, the helix angle of said thread being less at points on either side of the central portion of the worm, meshing with the thread thus generated a follower having a portion for engagement with the thread fashioned and maintained in substantial conformity with the helix angle of the worm at the central portion of the latter, and swinging said follower across and in engagement with said worm about an axis spaced to a less extent from the worm axis than the axis of the cutter, whereby portions of the side walls of the thread adjacent each end of the worm may be deformed and flattened to afford greater surface contact with the follower.

8. In apparatus for burnishing worms of the hour glass type, the combination with a support for a worm, of means for rotating said worm on the axis thereof, and a burnishing member supported on an axis transverse to the worm axis for traversing movement across said worm and at a less distance therefrom than the generating axis of the worm.

9. In apparatus for burnishing worms of the hour glass type, the combination with a support for a worm, of means for rotating said worm on the axis thereof, and a burnishing member supported on an axis transverse to the worm axis for traversing movement across said worm and at a less distance therefrom than the generating axis of the worm, and means supporting said burnishing member in a position corresponding to the helical angle of the thread at the central portion of said worm during the entire traversing movement of said member.

10. In apparatus for burnishing worms of the hour glass type formed by generation to provide a thread having a helix angle greater in the central portion than at the ends, the combination with means supporting said worm for rotation on the axis thereof, of a burnishing member having a circumferential rib, means supporting said member in engagement with said thread with the rib disposed so as to correspond to the helix angle of the thread in the central portion of said worm, said last named means being supported for rotation about an axis located substantially in a perpendicular from the central portion of the worm axis, whereby said member may be traversed across said worm.

11. In apparatus for burnishing worms of the hour glass type formed by generation to afford a thread helix angle greater in the central portion than at the ends, the combination with means supporting said worm for rotation on the axis thereof, of a burnishing member having a circumferential rib, means supporting and maintaining said member in engagement with said thread in a position corresponding to the helix angle of the thread in the central portion of said worm, said last named means being supported for rotation about an axis located substantially in a perpendicular from the central portion of the worm axis, and yielding means for applying pressure to said last named means to urge said burnishing member into engagement with said worm.

12. In apparatus for burnishing worms of the hour glass type, the combination with a circumferentially ribbed roller, means supporting said worm for rotation on the axis thereof, means supporting said roller for rotation about an axis materially closer to the worm axis than the generating axis of the worm, driving means for rotating said worm, and mechanism for effecting relative displacement of the supporting means for said worm and roller to apply pressure between the contacting surfaces of the latter.

13. In apparatus for burnishing worms of the hour glass type, the combination with a circumferentially ribbed roller, of means for supporting the roller and a worm to be burnished in meshing relation, and means for rotating the worm on the axis thereof and for swinging the roller about a transverse axis differing from the generating axis of the worm.

14. In apparatus for burnishing worms of the hour glass type, the combination with a circumferentially ribbed roller, of means for supporting the roller and a worm to be burnished in meshing relation, means for rotating the worm on the axis thereof and for swinging the roller about an axis differing from the generating axis of the worm but disposed closer to the worm, and means for simultaneously applying pressure between the contacting surfaces of said worm and roller.

15. The method of forming a worm of the hour glass type which comprises effecting a single rough cutting operation, and thereafter rotating said worm in contact with a member under pressure, said member being swingable about an axis lying closer to the worm than the generating axis of said worm, to substantially alter the thread shape adjacent the ends of the worm without materially altering the thread shape adjacent the central portion of the worm.

16. In apparatus for burnishing worms of the hour glass type, the combination with means for supporting a generated worm of varying helix angle on the rotational axis thereof, a hardened roller having a plurality of circumferential ribs, a carrier supporting said roller, said carrier being mounted for swinging movement about an axis transverse to the worm axis and spaced therefrom to a less extent than the generating axis of the worm, said carrier being constructed to support said roller for rotation on its own axis while maintaining the roller against displacement about an axis intersecting the roller axis and the worm axis, means urging said carrier into a position in which the roller ribs and worm thread are in intimate engagement with the ribs of the roller presented at an angle corresponding to the helix angle of the worm at the central portion of the latter, and means for rotating the worm to traverse the roller along the worm thread.

JOHN M. CHRISTMAN.